United States Patent [19]
Fletcher et al.

[11] 3,817,627
[45] June 18, 1974

[54] SPECIFIC WAVELENGTH COLORIMETER

[76] Inventors: James C. Fletcher, Administrator of the National Aeronautics and Space Administration with respect to an invention of; Carle C. Brawner, Brea; Larry S. McDavid; John M. Walsh, Fullerton, all of Calif.

[22] Filed: Feb. 13, 1973

[21] Appl. No.: 331,760

[52] U.S. Cl.................. 356/180, 356/246, 250/576
[51] Int. Cl. .............................................. G01j 1/42
[58] Field of Search ............ 250/218, 576; 356/180, 356/182, 186, 205, 246; 210/2

[56] References Cited
UNITED STATES PATENTS

| | | | |
|---|---|---|---|
| 2,583,559 | 1/1952 | Frost | 210/62 |
| 3,401,591 | 9/1968 | Anthon | 250/218 |
| 3,411,012 | 11/1968 | Bayly | 356/36 |
| 3,652,861 | 3/1972 | Engholdt | 250/218 |
| 3,679,315 | 7/1972 | Laucournet et al. | 356/180 |
| 3,707,331 | 12/1972 | George et al. | 250/218 |

OTHER PUBLICATIONS

Abstract N71-35264, Scientific Technical Aerospace Reports (STAR) Vol. 9, No. 22, Nov. 15, 1971, page 3547. (Original Article Listed in USGRDR Vol. 72, No. 4, Feb. 25, 1972)

*Primary Examiner*—Ronald L. Wibert
*Assistant Examiner*—R. J. Webster
*Attorney, Agent, or Firm*—Edward K. Fein; John R. Manning; Marvin F. Matthews

[57] ABSTRACT

A self contained, specific wavelength, single beam colorimeter for direct spectrophotometric measurement of the concentration of a given solute in a test sample. An electrical circuit employing a photoconductive cell converts the optical output into a linear, directly readable meter output. The colorimeter is simple to operate and is adapted for use in zero gravity conditions. In a specific application, the colorimeter is designed to analyze the concentration of iodine ($I_2$) in potable water carried aboard a space vehicle such as the IVB stage of Skylab.

26 Claims, 5 Drawing Figures

POSITION 2

POSITION 3

SPECIFIC WAVELENGTH COLORIMETER

The invention described herein was made in the performance of work under a NASA Contract and is subject to the provisions of Section 305 of the National Aeronautics and Space Act of 1958, Public Law 85-5-68 (72 Stat. 435; 42 U.S.C. 2457).

BACKGROUND OF THE INVENTION

1. Field of the Invention

The present invention relates generally to the field of testing and measuring. In particular, the present invention relates to a specific wavelength, single beam colorimeter employed to measure the concentration of a given solute in a test sample by direct spectrophotometric analysis. The embodiment of the invention described hereinafter in detail is designed to be used under zero gravity conditions to measure the concentration of iodine in the potable water supply of a spacecraft.

2. Description of the Prior Art

In general, colorimeters operate by transmitting light through a translucent sample and examining the transmitted light to obtain some information about the sample. Often, the transmitted light is simultaneously compared with the light transmitted through a standard sample having known composition or characteristics. This latter technique is accomplished with a dual beam colorimeter.

One or more color producing reagents are sometimes added to the test sample for the purpose of producing a color change in the sample. The resulting color is a function of the type and concentration of a particular solute in the sample. The wavelength and intensity of the light transmitted through the reacted sample are in turn a function of sample color and optical density so that information regarding the concentration of the solute can be extrapolated by examining the transmitted light.

The accuracy of conventional colorimeters and techniques depend upon the precise positioning of lenses, the production of a steady light from a stable source, exact spacing between light source and detector, the use of just the right amount of one or more specific reagents and other similar factors. These factors are normally relatively easy to control under standard laboratory condition, and for most purposes, conventional colorimeter technology and equipment are satisfactory.

Other well known techniques involving electrochemical or titration procedures are also capable of measuring the amount of a low concentration solute present in a test sample. For example, see Textbook of Quantitative Inorganic Analysis, Chapter 39, "Iodimetry and Iodometry," pp. 614–639; Kolthoff and Sandell, McMillan Co., N. Y. 1948. Under typical laboratory conditions and with commonly available equipment, such techniques may be employed for example to establish a concentration of less than 10 parts per million (ppm) of iodine ($I_2$) in water.

The problem is significantly greater, however, where standard wet cell analysis is employed and the iodine to be measured is in solution with high levels of iodine. The problem of accurately measuring solute concentrations in a moving laboratory is also significantly greater and cannot easily be solved with the use of conventional colorimeters and techniques. For example, where the laboratory or test site is contained within a spacecraft, the spacecraft movement may cause misalignment of optical components found in common colorimeters. Moreover, the zero gravity conditions in which a spacecraft is operated prevent the use of many conventional sample holding devices and also prevent the use of any gravity dependent techniques in the analytical process. Additionally, the relatively indirect and complicated procedures employed in the operation of conventional colorimeters may impose unnecessary hardship on the technicians in the spacecraft. The use of techniques requiring one or more reagents or complexing agents is also undesirable in a spacecraft because of the need to measure out the additives for each test and the need to store a sufficient supply of such materials so that testing may be conducted over a relatively long period. Some reagents and complexing agents have a limited shelf life which would also limit or prevent their usage on extended missions.

A simple, accurate, and easily operated colorimeter is required on a spacecraft to measure the amount of iodine present in the onboard drinking water. The iodine is required in that it functions as a bacteriocidal agent which renders the onboard water safe for drinking. The amount of iodine required to keep the water at a safe level is less than 10 ppm. Because of the low level of the desired concentration and because of the danger from too high or too low a concentration, any device or technique employed to keep an accurate measure of the amount of iodine in the water must be highly sensitive, accurate, and reliable.

SUMMARY OF THE INVENTION

The colorimeter of the present invention provides a specific wavelength colorimeter for the direct spectrophotometric measurement of the concentration of iodine in water. Accurate measurements are obtained even where the iodine is in solution with high concentrations of iodides. No reagents or complexing materials are required and the need for a separate optical pathway or system for supplying a reference or standard is eliminated.

A movable piston is positioned in a cylinder to form a test chamber. A manually operated rack and pinion drive is employed to move the piston through the chamber so that the assembly functions as a pump. An inlet port is positioned adjacent the fixed end of the chamber so that the chamber may be connected through a three way valve to a supply of distilled water or to the water supply being tested for iodine content. By rotating an empty-fill knob connected to the piston drive, the technician increases the chamber size to draw material into the test chamber. Rotating the knob in the opposite direction expels the material.

A light source carried in the piston is employed to emit light through a transparent window in the piston head. The light is directed axially through the test chamber and through a transparent window at the fixed end of the chamber where it is optically filtered. The filtered light strikes a sensitive optical-to-electrical transducer which produces an electrical detector signal which varies in amplitude as a function of the intensity of the light incident on its photoconductive surface. The optical filter is employed in the optical system to preferentially transmit light having the wavelength which is most strongly absorbed by the solute being measured. Where iodine ($I_2$) is being measured, the filter preferentially transmits light having a wavelength of 462 nanometers (nm).

The detected electrical signal is amplified by a detector amplifier circuit to form an electrical output which is linearly related to the intensity of the light transmitted through the test chamber. The electrical output is employed to drive an output display meter. A lamp regulator circuit is employed to supply stable power to the lamp source. The colorimeter, detector amplifier circuit, regulator circuit, and batteries for powering the circuits are assembled to form a self contained, hand-held unit. External controls on the unit are provided for calibrating the span of the meter output by establishing meter readings for a zero concentration sample and a maximum concentration sample. Zero level calibration is effected with distilled water in the test chamber. A span filter is provided to be inserted into the optical path to provide the upper level meter setting.

The regulator circuitry maintains a constant supply of power to the light source over the life of the batteries and for the duration of each testing usage. The circuit employs a zener diode reference, an operational amplifier, and a power transistor. The zener diode provides a reference voltage for the regulator circuit and also provides voltage bias for the optical-to-electrical transducer and provides a reference voltage to an operational amplifier in the detector circuit.

The foregoing and other objects, advantages, and features of the present invention will be more readily apparent from the following specification, claims, and the related drawings.

DESCRIPTION OF THE ILLUSTRATED EMBODIMENT

Figure 1:
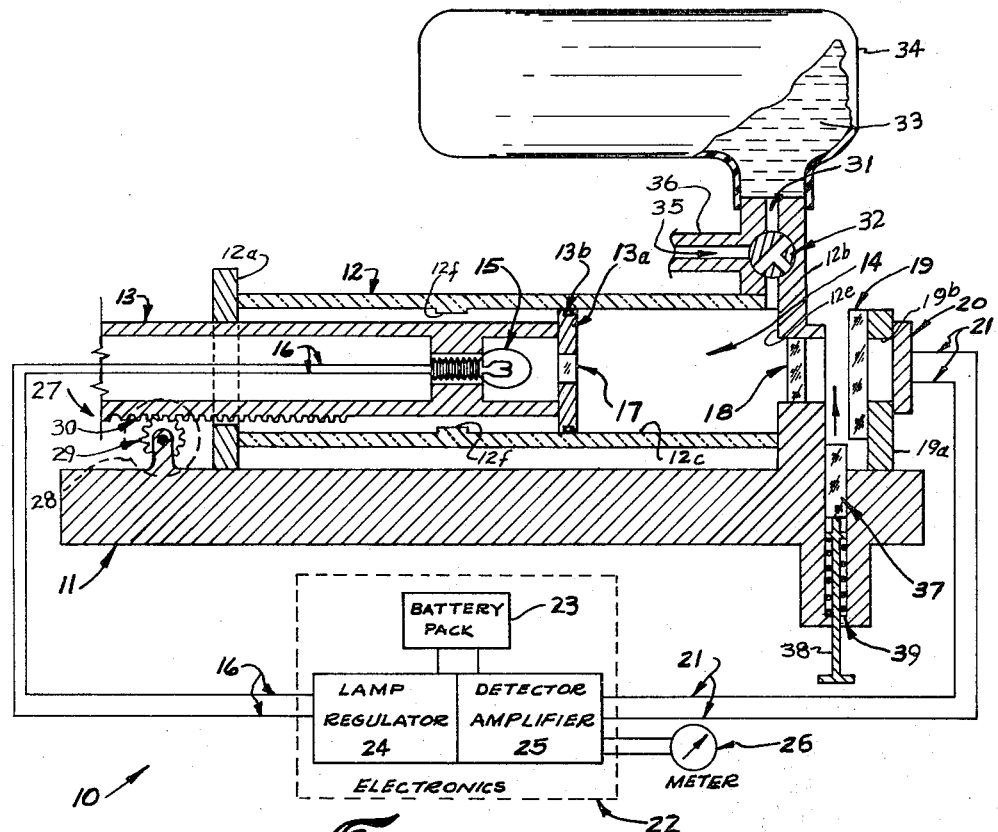
FIG. 1 is a vertical section schematically illustrating the cylinder and piston sample holding structure of the present invention and a schematic block diagram of the lamp regulator, battery pack, detector amplifier, and output meter portions of the present invention.

One form of the specific wavelength colorimeter of the present invention is indicated generally at 10 in FIG. 1. The colorimeter 10 includes a suitable base or mounting structure 11 which may be constructed of any suitable material capable of maintaining the colorimeter components in their assembled, aligned positions. A precision-bore cylinder 12 is mounted between upstanding end members 12a and 12b which in turn are mounted on the structure 11. The cylinder 12 may be constructed of Pyrex. glass or other suitable material. Members 12a and 12b may be secured to the structure 11 by any suitable means and if desired may be an integral portion of the structure.

A tubular piston 13 is mounted for axial movement through a bore 12c extending through the cylinder 12. One end of the piston 13 is equipped with a piston head 13a surrounded by an annular O-ring seal 13b. The piston head 13a may be constructed of a chlorotrifluoroethylene polymer such as Kel-F manufactured by the 3M Company. The head may be secured to the piston 13 by any suitable means. Seal 13b is constructed of a suitable chemically stable sealing material such as tetrafluoroethylene capable of forming a slidable, sealing engagement with the wall of the surrounding bore 12c. It will be appreciated that any other suitable materials may also be employed for the cylinder 12, piston head 13a, and seal 13b.

The piston head 13a, cylinder bore 12c, and the fixed cylinder end 12e cooperate to form a substantially cylindrical sample receiving chamber 14. Stops 12f limit the outward travel of the cylinder head so that the same piston position is established each time a test is conducted.

A light source 15 energized through electrical leads 16 is mounted within the tubular body of the piston 13. The light source 15 may be a conventional incandescent bulb of the type employed in flashlights and other small lights. A transparent glass window 17 formed in the piston head 13a and a second transparent glass window 18 formed in the mounting member 12b provide an optical path which permits light emitted from the source 15 to travel axially through the chamber 14 to an optical filter 19. The optical filter 19 preferentially transmits light of a selected wavelength which, for the purposes of determining the concentration of iodine, is 462 nm. The filter 19 is held in position on the structure 11 by a filter mount 19a. An aperture 19b through the mount 19a permits the light transmitted by the filter 19 to strike the photosensitive surface of an optical-to-electrical transducer 20 which is also held in position by the mount 19a. It will be appreciated that the positons of the lamp 15 and transducer 20 may be reversed without affecting the operation of the colorimeter 10. The light path length between the lamp and transducer with the piston head 13a against the stops 12f may be as short as 5 cm or shorter without significantly reducing the sensitivity of the colorimeter.

The electrical output from the transducer 20 is transmitted by electrical conductors 21 to an electrical section 22 which includes a source of electrical energy provided by a battery pack indicated in block diagram at 23, a lamp regulator circuit 24 powered by the battery pack, and a detector amplifier circuit 25 also powered by the battery pack. The circuit 24 maintains a stable electrical power supply to the light 15 over the entire life of the batteries in the battery pack 23. The detector amplifier circuit 25 converts the electrical signal provided over the lines 21 to an amplified electrical output signal which is employed to drive a directly readable output meter 26.

Referring to the mechanical portions of the assembly 10, the piston 13 is equipped with a rack and pinion drive indicated generally at 27 which is employed to move the piston axially through the bore 12c of the cylinder 12. Preferably, the rack and pinion drive includes a knob indicated in dotted line at 28 which may be manually engaged from the outside of the assembly 10. The knob is fixed to a pinion gear 29 which in turn engages a rack 30 carried by the piston 13. The piston 13 may be reciprocated through the cylinder 12 by clockwise and counterclockwise rotation of the knob 28 by the operator causing the assembly to function as a pump. The piston 12 is moved toward the chamber end 12e to expel material from the chamber 14 and is moved away from the fixed end 12e to positively draw material into the chamber.

Figure 3:
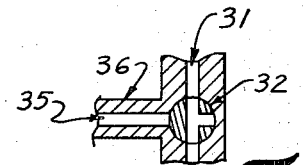
FIG. 3 is a vertical elevation through the three way valve portion of the present invention indicating one valve position.
Figure 4:
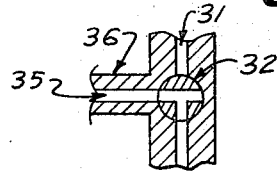
FIG. 4 is a view similar to FIG. 3 illustrating a second valve position.

An inlet and ejection port line 31 communicates with the chamber 14 to permit test material to be drawn into and expelled from the chamber. A three way valve 32 connected to the port line may be manually operated to permit a standard material 33 contained in a flexible bag 34 or an unknown test material 35 in a supply line 36 to be drawn into the chamber 14. When used for iodine monitoring aboard a spacecraft, the material 33 is distilled water, the test material 35 is drinking water, and the line 36 connects into the spacecraft water system. When the valve 32 is in position 1 illustrated in FIG. 1, the standard material 33 and the test material 35 are completely sealed away from the chamber 14. When the valve is in position 2 illustrated in FIG. 3, the standard material 33 may be drawn into the chamber 14; and when the valve is in position 3 illustrated in FIG. 4, the test material may be drawn into the chamber.

During the calibration of the colorimeter 10, the standard sample material 33 is drawn into the chamber 14 and the circuitry 22 is adjusted to provide the output reading on the meter 26 corresponding to the known concentration of the solute in the material 33. When the colorimeter 10 is designed to measure the concentration of iodine in water, the material 33 contains distilled water having a zero iodine content and the meter 25 is adjusted accordingly.

Following the zero setting, the maximum setting for the meter 26 may be established by inserting a calibration filter 37 into the light path. The filter 37 is preferably secured to an operating shaft 38 which may be manually depressed to move the filter into the light path. A coil spring 39 removes the filter from the light path when the shaft 38 is released. The filter 37 is a neutral density optical filter which reduces the intensity of light striking the transducer 20 to that which would occur when a sample having the maximum concentration of iodine was present within the chamber 14. Both the zero and maximum settings are effected with the chamber 14 containing distilled water.

The assembly 10 including the piston and cylinder assembly and the electrical circuitry 22 are preferably enclosed within a suitable housing (not illustrated) to form a hand-held unit. The knob 28, shaft 38 and valve 32 are preferably accessible externally of any housing which may be employed to contain the assembly. The meter 26 may be any conventional electrically responsive meter and, if desired, may be mounted as a part of the unitary assembly 10. It will also be appreciated that if desired, the meter 26 may be an external separately mounted meter having provisions for receiving the electrical output of the circuit 22. Suitable conventional light shielding means (not illustrated) should also be positioned about the colorimeter to prevent external light from interfering with the operation of the assembly.

Figure 2:
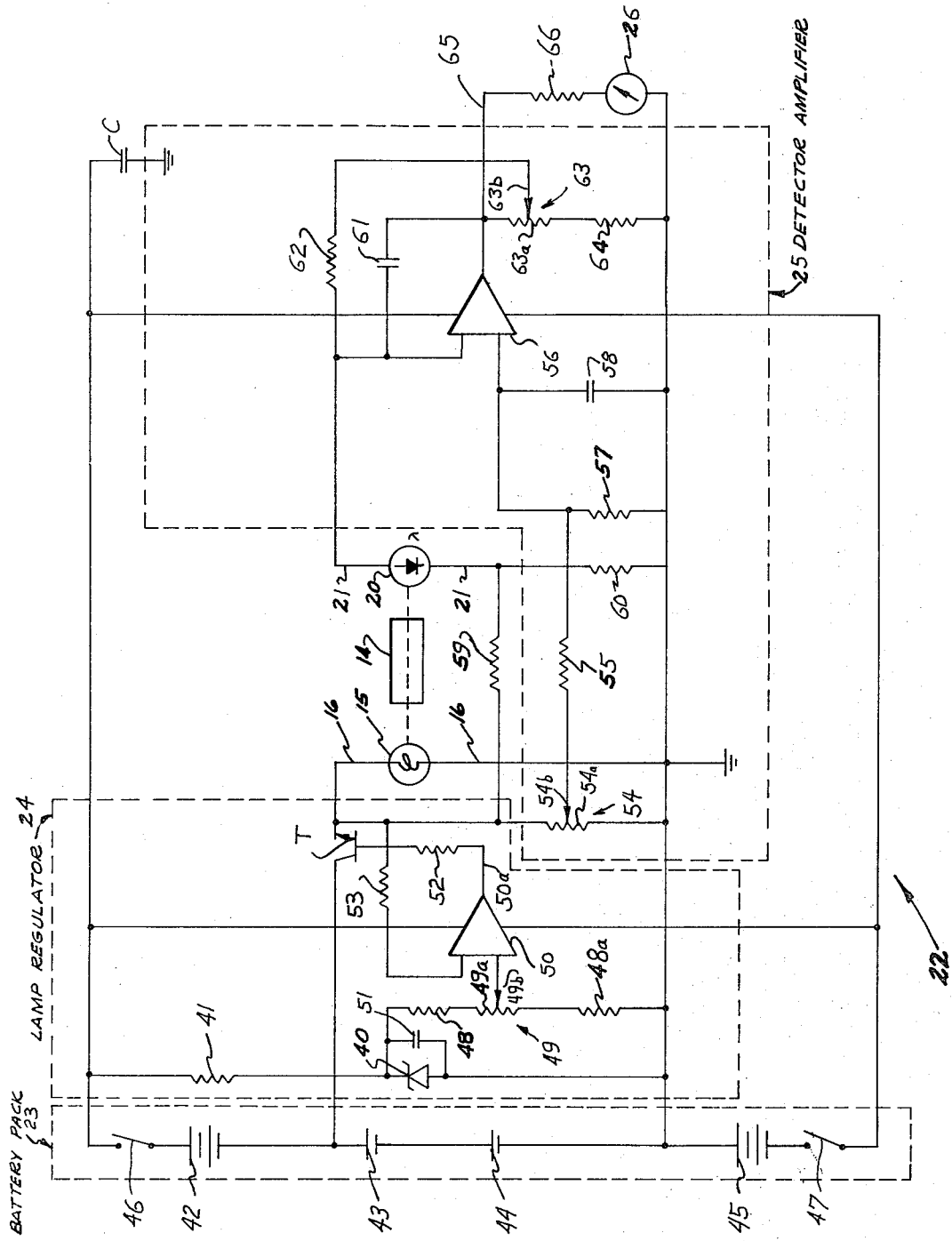
FIG. 2 is a schematic circuit diagram of the electrical circuitry indicated in block diagram form in FIG. 1.

The circuit 22 is illustrated in detail in FIG. 2. The lamp regulator portion 24 of the circuit includes a zener diode 40 designed to be operated in its reversed-bias breakdown mode to provide a constant reference voltage. Electrical current is supplied to the diode 40 through a resistor 41 from the battery pack 23. The battery pack includes batteries 42, 43, 44, and 45 connected in series in the manner illustrated. Switches 46 and 47 in the battery pack may be operated externally of the assembly housing to selectively supply power to the circuit components in the circuit 22. A capacitor C connected between chassis ground and the positive end of the battery pack 23 functions as an AC bypass.

The batteries 43 and 44 are preferably high-current mercury cells which are used to power the lamp source 15. Suitable battery cells are available with a capacity of 14,000-mA-hour which will allow 60 hours of operation at 250mA of lamp current. The cells 43 and 44 connected in series are selected to provide sufficient voltage to operate the lamp 15 and to allow sufficient collector-to-emitter voltage for a power transistor T. The batteries 42 and 45 are preferably low-current mercury cells having approximately 585-mA hours capacity. The low current cells are employed to supply approximately 5-mA for the diode 40 and for the operational amplifiers, reference voltages, and detector bias to be described.

The reverse current flow through the diode 40 establishes a fixed voltage level which is supplied across a voltage divider formed by the series connection of resistor 48, potentiometer 49, and resistor 48a. A capacitor 51 connected in parallel with the diode 40 filters out short duration noise pulses so that the voltage supplied to the voltage divider network remains constant.

The potentiometer 49 includes a resistance winding 49a and a movable tap 49b. The tap 49b is connected to the non-inverting input of a conventional operational amplifier 50. The output signal of the amplifier is formed on an output line 50a and supplied through a current limiting resistor 52 to the base of the power transistor T. The signal on the line 50a operates in a conventional manner to regulate the flow of emitter-collector current through the transistor T which in turn regulates the amount of current flowing through the filament of the lamp source 15. A feedback resistor 53 connected between the emitter of the transistor T and the negative or inverting input of the operational amplifier 50 provides negative feedback which is employed in a customary manner to provide a constant current flow through the resistor 48. Thus, as the current flow through the emitter-collector circuit of the transistor T reduces, thereby reducing the power supplied to the lamp 15, the feedback signal supplied to the inverting input of the amplifier 50 is reduced in like manner. This causes the output signal on the line 50a to increase which permits a larger amount of current flow through the transistor T to re-establish the desired output voltage. The value of this output voltage may be selected by appropriately setting the position of the movable tap 49b in the potentiometer 49.

The regulated current flow through the transistor T is also supplied to a potentiometer 54 in the detector amplifier circuit 25. Potentiometer 54 includes a resistance winding 54a and a movable tap 54b. The tap position 54b may be altered as desired to obtain a desired reference voltage which is supplied through a resistor 55 to the non-inverting input of a second operational amplifier 56. The reference voltage is supplied across a parallel RC filtering network provided by a resistor 57 and a capacitor 58 which functions to remove spurious noise signals.

The optical-to-electrical transducer 20 is connected to a voltage divider network formed by resistors 59 and 60 and forms a part of a negative feedback circuit for the amplifier 56. A feedback capacitor 61, resistor 52, and a second voltage divider network formed by a potentiometer 63 and a resistor 64 are also included in the feedback circuit. Potentiometer 63 includes a resistance winding 63a and a variable tap 63b whereby the position of tap 63b may be altered to change the gain of the amplifier 56. Preferably, the amplifier 56 includes a variable voltage gain of from 7 to 35 and amplifies the electrical output of the transducer 20 from 0 to 2.5 volts DC.

In operation, the feedback resistance for the operational amplifier 56 is dependent upon the resistance of the transducer 20 which in turn is dependent upon the intensity of the light striking the transducer's photosensitive surface. Component values in the circuit 25 are selected so that a linear relationship exists between the intensity of the light striking the photoconductive surface and the amplitude of the electrical signal produced by the operational amplifier 56 on an output line 65. The output signal on the line 65 is supplied through a resistor 66 to operate the meter 26.

The transducer 20 is preferably a PIN/photoconductive junction-type cell known as a Shottky Barrier Diode. The latter device has no memory of exposure to high intensity light and shows a broad range of spectral response to light having wavelengths of from 200 to 1,000 nm. Other devices, such as cadmium sulfide detector or other suitable optical-to-electrical transducing means, may also be employed.

In calibrating the circuit 22, when the test chamber 14 is filled with the standard solution, the potentiometer tap 54b is adjusted until the desired meter reading is obtained on the meter 26. The span filter is then inserted into the light path and the potentiometer tap 63b is adjusted until the desired meter reading corresponding to the known light transmission through the span filter is reached. When the calibration procedure is undertaken in a spacecraft, after setting the meter span, the distilled water can be discharged into the water supply by properly positioning the valve 32. This procedure washes out the chamber 14, prevents contaminating the distilled water supply and serves to flush any air out of the connecting line. The valve 32 is then moved to the position illustrated in FIG. 4 so that the outward movement of the piston 13 draws fluid from the water supply line into the chamber 14.

An important feature of the present invention is the use of an optical filter which preferentially transmits light having the wavelength which is most strongly absorbed by the solute being measured. It will be appreciated that the wavelength will vary for different solutes. The specific wavelength desired for a given solute may be determined by any conventional technique.

Figure 5:
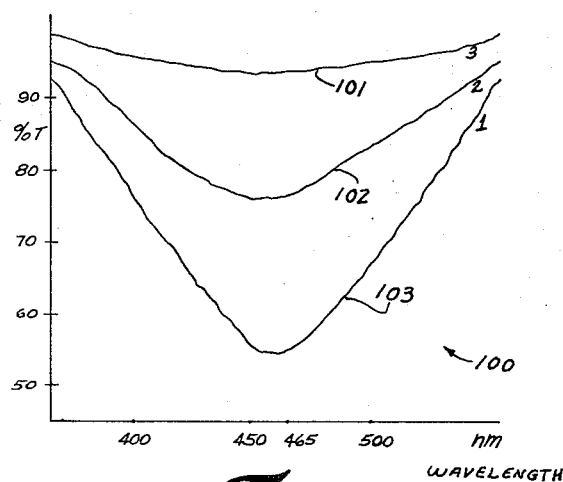
FIG. 5 is a graph representing the relationship between optical density in percent light transmission versus light wavelength for three samples having different concentrations of aqueous iodine ($I_2$).

FIG. 5 illustrates the relationship between percent light transmission and wavelengths for three different concentrations of iodine in water. Wavelength is shown on the horizontal axis and percent transmission is shown on the vertical axis of the chart 100. The graph is indicated generally at 100 and includes curves 101, 102, and 103 which are for concentrations of 1 ppm, 5 ppm, and 10 ppm, respectively, of iodine ($I_2$) in water. From the chart, it is evident that the percent of light transmission through the sample is greater for light of a wavelength on either side of approximately 462 nm. These curves were established using a conventional spectrophotometer at a 10 centimeter path length. During studies that were conducted on different samples, it was determined that if the solution is quite strong in iodine, or if iodide is also present, two other peaks at 352 and 388 nm appear. These latter two peaks are attributed to tri-iodide whereas the 462 nanometer peak is attributed to solvated iodine.

It will be appreciated that the colorimeter of the present invention may also be operated with filters other than the 462 nm filter employed for detecting iodine. The colorimeter may be used as a nephelometer in analytical procedures and its uses include procedures such as obtaining a cell count or hemoglobin content of blood.

The electrical components identified in the following listing were employed in the construction of the circuit 22.

| RESISTORS | | CAPACITORS | |
| --- | --- | --- | --- |
| REFERENCE CHARACTER | RATING IN OHMS | REFERENCE CHARACTER | RATING IN MICROFARADS |
| 41 | 5.1 K | 51 | 0.1 |
| 48 | 56 K | 58 | 750 |
| 48a | 15 K | 61 | 750 |
| 49 | 5 K | C | 0.1 |
| 52 | 1.2 K | | |
| 53 | 13 K | AMPLIFIERS | |
| 54 | 5 K | REFERENCE CHARACTER | MANUFACTURER | SPECIFICATIONS |
| 55 | 22 K | | |
| 57 | 200 M | | |
| 59 | 3000 K | | |
| 60 | 1 K | 50 | Analog Devices | AD502J |
| 62 | 22 M | 56 | Analog Devices | AD503J |
| 63 | 20 K | | |
| 64 | 1.2 K | | |
| 66 | 1 K | | |

| | TRANSISTORS | |
| --- | --- | --- |
| REFERENCE CHARACTER | MANUFACTURER | SPECIFICATIONS |
| T | Texas Instruments | 2N3421 |

| | PHOTOSENSITIVE DEVICE | |
| --- | --- | --- |
| REFERENCE CHARACTER | MAKER | SPECIFICATIONS |
| 20 | United Detector Technology Santa Monica, Calif. | UDT PIN-5 |

| RESISTORS | | CAPACITORS | |
|---|---|---|---|
| REFERENCE CHARACTER | RATING IN OHMS | REFERENCE CHARACTER | RATING IN MICROFARADS |

| | LAMP | |
|---|---|---|
| REFERENCE CHARACTER | MAKER | SPECIFICATIONS |
| 15 | Chicago Miniature Lamp | CM20-8-1 |

| | BATTERIES | | |
|---|---|---|---|
| REFERENCE CHARACTER | MAKER | | SPECIFICATIONS |
| 42 | | TR126 | 8.4V. |
| 43 | | RMIRT2 | 1.35 |
| 44 | Mallory | RMIRT2 | 1.35 |
| 45 | | TR126 | 8.4V. |

| | METER MOVEMENT | |
|---|---|---|
| REFERENCE CHARACTER | MAKER | SPECIFICATIONS |
| 26 | Conventional | 0-100μA |

| | DIODE | |
|---|---|---|
| REFERENCE CHARACTER | MAKER | SPECIFICATIONS |
| 40 | Motorola | 1N755A |

The foregoing disclosure and description of the invention is illustrative and explanatory thereof, and various changes in the size, shape, and materials, as well as in the details of the illustrated construction, may be made within the scope of the appended claims without departing from the spirit of the invention.

We claim:

1. A specific wavelength colorimeter comprising:
   a cylinder means;
   a sample receiving chamber means provided in said cylinder means;
   sample supply and ejection means opening into said chamber means;
   piston means carried in said cylinder means and movable axially through said cylinder means to draw sample material into said chamber means or to expel sample material from said chamber means;
   light source means connected with said colorimeter and disposed at a first axial end of said chamber means to direct light axially through said chamber means; and
   optical-to-electrical transducing means connected with said colorimeter and disposed at a second axial end of said chamber means to receive light from said source, said light source means and said transducing means are carried, one by said piston means and the other by said cylinder means.

2. A specific wavelength colorimeter as defined in claim 1 wherein said supply and ejection means includes a single opening extending through said cylinder means adjacent one of the axial ends of said chamber means.

3. A specific wavelength colorimeter as defined in claim 1 further including moving means for axially moving said piston means a predetermined amount through said cylinder means.

4. A specific wavelength colorimeter as defined in claim 2 further including moving means for axially moving said piston means a predetermined amount through said cylinder means.

5. A specific wavelength colorimeter as defined in claim 5 wherein:
   a. said piston means includes light transmitting means optically communicating with said chamber means; and
   b. said second axial end of said chamber means includes light transmitting means optically communicating with said chamber means.

6. A specific wavelength colorimeter as defined in claim 5 wherein said light source produces light which is transmitted through said light transmitting means included in said piston means, through said chamber means and through said light transmitting means included in said second axial end of said chamber means.

7. A specific wavelength colorimeter as defined in claim 6 further including moving means for axially moving said piston means a predetermined amount through said cylinder means.

8. A specific wavelength colorimeter as defined in claim 1 further including electrical circuit means and output indicator means connected with said transducer means for forming a readable indicator output which varies as a function of the intensity of light received by said transducer.

9. A specific wavelength colorimeter as defined in claim 8 wherein said circuit means includes zero adjustment means for calibrating said circuit means to produce a first readable indicator output value when the material in said chamber means has a first known concentration of a given solute.

10. A specific wavelength colorimeter as defined in claim 9 wherein said circuit means further includes span adjustment means for calibrating said circuit means to produce a second readable indicator output value when the material in said chamber means has a second known concentration of said solute.

11. A specific wavelength colorimeter as defined in claim 10 wherein said first known concentration is substantially zero.

12. A specific wavelength colorimeter as defined in claim 8 further including:
   a. electrical batteries for supplying electrical power to said light source means and said circuit means; and
   b. voltage regulation means for providing a substantially constant voltage to said light source means.

13. A specific wavelength colorimeter as defined in claim 11 further including:

a. electrical batteries for supplying electrical power to said light source means and said circuit means; and b. voltage regulation means for providing a substantially constant voltage to said light source means.

14. A specific wavelength colorimeter as defined in claim 12 wherein said voltage regulation means includes a zener diode means for providing a first reference voltage, an operational amplifier having one input supplied by said first reference voltage, an electrical power switching means regulated by the output of said operational amplifier, and a feedback connection between the output of said switching means and a second input to said operational amplifier whereby the output of said switching means is maintained substantially constant.

15. A specific wavelength colorimeter as defined in claim 14 wherein:

a. said first reference voltage is employed to establish the voltage bias on said transducer and to establish a reference input voltage to a second operational amplifier;

b. said second amplifier is employed for driving said indicator means; and c. said transducing means is included in a feedback circuit forming a second input to said second amplifier whereby changes in the conductivity of said transducing means changes the gain of said second amplifier to change the value displayed on said indicator means.

16. A specific wavelength colorimeter as defined in claim 15 wherein said reference input voltage to said second amplifier is adjustable to provide a zero adjustment means for calibrating said circuit means to produce a first readable indicator output value when the material in said chamber means has a first known concentration of a given solute.

17. A specific wavelength colorimeter as defined in claim 16 further including span filter means operable for movement into the light path between said light source and said transducer for establishing a light absorption value corresponding to the maximum desired absorption for calibrating the span of said output indicator means.

18. A specific wavelength colorimeter as defined in claim 17 wherein said second amplifier includes adjustable gain means for calibrating the span of said output indicator means when said span filter means is in said light path.

19. A specific wavelength colorimeter as defined in claim 18 wherein said transducer includes a photoconductive cell.

20. A specific wavelength colorimeter as defined in claim 19 wherein said transducer includes a photoconductive cell of the junction-type operated in the photovoltaic mode.

21. A specific wavelength colorimeter as defined in claim 1 further including an optical filter means disposed between said light source means and said transducing means for transmitting light of substantially a given wavelength to said transducing means.

22. A specific wavelength colorimeter as defined in claim 21 wherein said optical filter means preferentially transmits light of approximately 462 nanometers in wavelength for determining the concentration of iodine in said sample material.

23. A specific wavelength colorimeter as defined in claim 22 wherein:

a. said sample supply and ejection means is connected with a source of distilled water and with a source of test water having an unknown concentration of iodine; and b. valving means are connected with said sample supply and ejection means for selectively controlling the supply or ejection of distilled water or test water to or from said chamber means.

24. A specific wavelength colorimeter as defined in claim 23 wherein said source of distilled water is contained within a collapsible bag.

25. A specific wavelength colorimeter as defined in claim 20 wherein:

a. an optical filter means is disposed between said light source means and said transducing means for transmitting light of substantially a given wavelength to said transducing means;

b. said sample supply and ejection means is connected with a source of distilled water and with a source of test water having an unknown concentration of iodine;

c. valving means are connected with said sample supply and ejection means for selectively controlling the supply or ejection of distilled water or test water to or from said chamber means; and d. said source of distilled water is contained within a collapsible bag.

26. A specific wavelength colorimeter as defined in claim 25 wherein said optical filter means preferentially transmits light of approximately 462 nanometers in wavelength for determining the concentration of iodine in said sample material.

* * * * *